T. J. ELLISON.
ANIMAL TRAP.
APPLICATION FILED MAY 15, 1912.

1,040,657.

Patented Oct. 8, 1912.

Witnesses
E. Larson
M. A. Schmidt

Inventor
Thomas J. Ellison.
By Eugene E. Stevens
Attorney.

UNITED STATES PATENT OFFICE.

THOMAS J. ELLISON, OF TERRILL, KENTUCKY.

ANIMAL-TRAP.

1,040,657.  Specification of Letters Patent.  Patented Oct. 8, 1912.

Application filed May 15, 1912. Serial No. 697,453.

*To all whom it may concern:*

Be it known that I, THOMAS J. ELLISON, a citizen of the United States, residing at Terrill, in the county of Madison and State of Kentucky, have invented certain new and useful Improvements in Animal-Traps, of which the following is a specification.

This invention relates to animal traps in which the animal is ensnared by means of a noose which is sprung when the animal steps thereinto or otherwise enters the same.

It is the object of the present invention to provide a trap of the kind stated which is simple in construction, and reliable in operation, and which can be easily set.

The invention also has for its object to provide a trap which will not injure the fur of the animal, and which can be adjusted for large or small animals.

With these objects in view, the invention consists in a novel construction and arrangement of parts to be hereinafter described and claimed, reference being had to the accompanying drawing forming a part of this specification, in which drawing—

Figure 1:
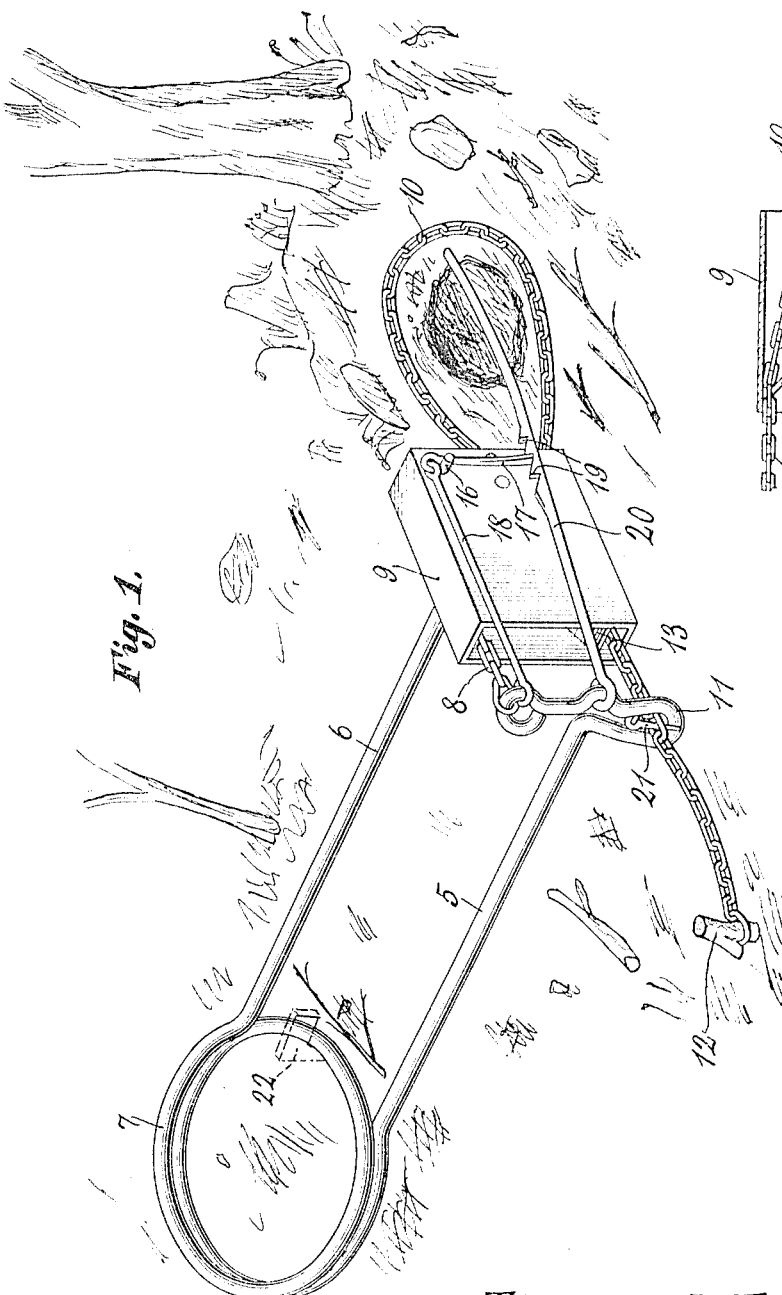
Figure 2:
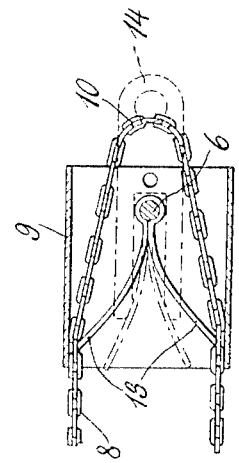
Figure 3:
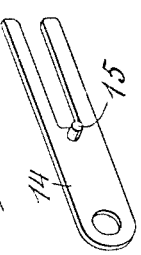

Figure 1 is a perspective view of the trap set. Fig. 2 is a detail showing the pawls for holding the chain. Fig. 3 is a perspective view showing the device for holding the pawls in inoperative position.

Referring specifically to the drawing, 5 and 6 denote two spring arms which are connected at one of their ends by a spring loop 7 which tends to force the two arms outward away from one another.

To the free end of the arm 5 is made fast one end of a chain or other flexible device 8 which passes through a housing 9 carried by the free end of the arm 6, and after being formed in a noose or loop 10 on the outside of the housing, the chain passes back through the latter and through a loop 11 in the free end of the arm 5 and thence extends and is made fast to a suitable anchoring device 12 which is driven into the ground.

Within the housing 9 are located two spring fingers 13 which are so tensioned that they are normally spread apart. The fingers are composed of a strip of suitable spring metal which is bent around and made fast intermediate its ends to the extremity of the arm 6 which latter passes through the housing, said housing being made fast to the arm in any suitable manner. The two ends of the chain 8 lie between the free ends of the fingers 13 and the adjacent walls of the housing. The fingers serve as pawls to prevent the chain from slipping in a direction to enlarge the noose 10.

In order to retract the fingers 13 and hold them in this position when setting the trap, there is provided a key 14 which is adapted to straddle the fingers and draw the same together, whereby the chain 8 is released. This action is illustrated in Fig. 2 of the drawing. The key has a projecting pin 15 which is adapted to enter an aperture in the wall of the housing 9, which will hold the key in place until the trap is set.

The housing 9 carries, on the outside thereof, a projecting pin 16 across which is adapted to be extended a trigger 17 carried by a link 18 which is loosely connected to the free end of the arm 5. The trigger is engageable with one of a series of notches 19 in a detent 20 which is loosely connected to the free end of the arm 5. The trigger and detent are employed for holding the trap set, and the trap is sprung by releasing the detent, as will be hereinafter described.

The operation of the trap is as follows: The fingers 13 having been placed in release position as already described, the chain 8 is drawn through the housing and the noose 10 formed. The two arms 5 and 6 are pressed together and locked in this position by the trigger 17 and the detent 20. The trap will be placed adjacent to the hole made by the animal, with the noose adjusted so as to extend around the mouth of the hole. The detent 20 is of such length that the free end extends into the noose. The animal upon emerging from or entering the hole must pass into the noose, and upon coming in contact with the detent 20 releases the trigger 17, whereupon the arms 5 and 6 are suddenly expanded and the noose is drawn tight around the animal. The fingers 13 prevent the chain from slipping back to loosen the noose but permit the chain to slip in a direction to tighten the noose, so that the harder the animal pulls or jerks on the chain the tighter the noose will be drawn. Adjacent to the loop 11, the arm 5 carries a pivoted pin 21 which is adapted to be passed through one of the links of the chain 8 when the trap is set, so that the noose will be drawn the same on both sides. When the animal is caught and begins to pull, the pin 21 slips out of the chain-link, and the chain is left free to permit the noose to tighten as already described.

The trap may be baited, and it can be adjusted to large and small animals, and also placed at the mouth of a den, the noose being supported in vertical position by strands of grass or other suitable means. The trap can also be anchored to the ground by means of a spike or other suitable device 22 passing through the loop 7 and driven into the ground.

I claim:

1. An animal trap comprising a pair of spring-arms, means for locking the arms against spreading, a chain having one of its ends fastened to one of the spring-arms and formed into a noose, an anchoring device for the other end of the chain, a housing on the other spring-arm through which housing the chain passes, the noose being located outside the housing, pawls in the housing for holding the chain from slipping in one direction, and a detent for holding and releasing the locking means, said detent extending into the noose.

2. An animal trap comprising a pair of spring-arms, a chain having one of its ends fastened to one of the spring-arms and formed into a noose, an anchoring device for the other end of the chain, a housing on the other spring-arm through which housing the chain passes, the noose being located outside the housing, pawls in the housing for holding the chain from slipping in one direction, a trigger carried by the first mentioned spring-arm, a pin on the housing engageable by the trigger, and a detent for holding and releasing the trigger, said detent extending into the noose.

3. An animal trap comprising a pair of spring-arms, means for locking the arms against spreading, a chain having one of its ends fastened to one of the spring-arms and formed into a noose, an anchoring device for the other end of the chain, releasable means for locking the last-mentioned end of the chain to the spring-arm to which its other end is fastened, a housing on the other spring-arm through which housing the chain passes, pawls in the housing for holding the chain from slipping in one direction, and a detent for holding and releasing the locking means, said detent extending into the noose.

4. An animal trap comprising a pair of spring-arms, a chain having one of its ends fastened to one of the spring-arms and formed into a noose, an anchoring device for the other end of the chain, releasable means for locking the last-mentioned end of the chain to the spring-arm to which its other end is fastened, a housing on the other spring-arm through which housing the chain passes, pawls in the housing for holding the chain from slipping in one direction, a trigger carried by one of the spring-arms, a pin on the other spring-arm engageable by the trigger, and a detent for holding and releasing the trigger, said detent extending into the noose.

5. An animal trap comprising a pair of spring-arms, means for locking the arms against spreading, a chain having one of its ends fastened to one of the spring-arms and formed into a noose, said spring-arm having a loop through which the other end of the chain loosely passes, an anchoring device for the last-mentioned end of the chain, a pin carried by said spring-arm and releasably engaging said end of the chain, a housing on the other spring-arm through which housing the chain passes, pawls in the housing for holding the chain from slipping in one direction, and a detent for holding and releasing the locking means, said detent extending into the noose.

In testimony whereof I affix my signature in presence of two witnesses.

THOMAS J. ELLISON.

Witnesses:
A. M. DAVISON,
S. P. DEATHWAGE.